US011867340B2

(12) United States Patent
Campen et al.

(10) Patent No.: US 11,867,340 B2
(45) Date of Patent: Jan. 9, 2024

(54) STRESS RELIEF ADAPTERS AND STRESS RELIEF ADAPTER SYSTEMS

(71) Applicant: DEERE & COMPANY, Moline, IL (US)

(72) Inventors: Thomas M. Campen, Davenport, IA (US); Douglas A. Nimrick, Cambridge, IL (US); Cameron J. Butler, Prophetstown, IL (US)

(73) Assignee: Deere & Company, Moline, IL (US)

( * ) Notice: Subject to any disclaimer, the term of this patent is extended or adjusted under 35 U.S.C. 154(b) by 161 days.

(21) Appl. No.: 17/454,322

(22) Filed: Nov. 10, 2021

(65) Prior Publication Data

US 2023/0142348 A1 May 11, 2023

(51) Int. Cl.
*F16L 57/02* (2006.01)
*F16L 3/12* (2006.01)

(52) U.S. Cl.
CPC ............... *F16L 57/02* (2013.01); *F16L 3/12* (2013.01)

(58) Field of Classification Search
CPC .................................. F16L 57/02; F16L 3/12
USPC .................................................. 138/109, 106
See application file for complete search history.

(56) References Cited

U.S. PATENT DOCUMENTS

| 5,143,409 A | 9/1992 | Lalikos |
| 5,330,236 A * | 7/1994 | Peterjohn ............... F16L 33/32 285/423 |
| 5,526,846 A | 6/1996 | Maloberti |
| 6,009,907 A * | 1/2000 | Secher .................. E21B 17/017 138/109 |
| 6,193,282 B1 | 2/2001 | Assenheimer |
| 8,921,744 B2 | 12/2014 | Rosenfeldt et al. |
| 9,625,071 B2 | 4/2017 | Melo et al. |
| 10,935,174 B2 | 3/2021 | Pennybacker et al. |
| 2008/0007044 A1 * | 1/2008 | Kertesz ............... F16L 25/0045 285/95 |
| 2013/0220470 A1 * | 8/2013 | Haeckel .................. F16L 51/00 138/109 |

FOREIGN PATENT DOCUMENTS

AU 779043 B2 1/2005

OTHER PUBLICATIONS

More Information on Strain Reliefs/Cable Glands, pp. 1-5 [online], [retrieved on May 17, 2021]. Retrieved from the Internet: <URL: https://www.interpower.com/ic/designers/in-depth-product-line-information/More-Information-on-Strain-Reliefs-Cable-Glands.html>.

* cited by examiner

*Primary Examiner* — Patrick F Brinson

(57) ABSTRACT

Systems and apparatuses for routing resources may include an adapter coupled to a conduit, such as to an end of a conduit. The adapter may include a central passage extending along and concentrically disposed about a central longitudinal axis. The adapter may include a first end portion that includes a plurality of apertures that are circumferentially arranged about the central longitudinal axis and extend transversely relative to the central longitudinal axis; a tapered portion that tapers about and along the central longitudinal axis; and a first grooved portion disposed between the first end portion and the tapered portion.

20 Claims, 6 Drawing Sheets

STRESS RELIEF ADAPTERS AND STRESS RELIEF ADAPTER SYSTEMS

FIELD OF THE DISCLOSURE

The present disclosure relates generally to stress relief systems and apparatuses and, particularly, to stress relief systems and apparatuses for industrial applications.

BACKGROUND OF THE DISCLOSURE

Conduits can be used to route resources from one location to another. For example, conduits can be used to route resources such as fluids, electrical power, data lines as well as other resources. The resources can be provided within a separate conduit or protective casing, and the resources can extend through a central passage of the conduit. The conduit provides grouping and a protective barrier for the resources.

SUMMARY OF THE DISCLOSURE

A first aspect of the present disclosure is directed to a stress relief adapter. The stress relief adapter may include a body defining a central passage extending along and concentrically disposed about a central longitudinal axis. The body may include a first end portion that includes a plurality of apertures that are circumferentially arranged about the central longitudinal axis and extend transversely relative to the central longitudinal axis; a tapered portion that tapers about and along the central longitudinal axis; and a first grooved portion disposed between the first end portion and the tapered portion.

A second aspect of the present disclosure is directed to a stress relief adapter system. The stress relief adapter may include a cylindrical conduit. The cylindrical conduit may include a first end, a second end, a first central passage extending from the first end to the second end, a first central longitudinal axis extending along the central passage, an exterior surface, and a plurality of annular grooves formed in the exterior surface and extending circumferentially about the first central longitudinal axis. The stress relief adapter system may also include an adapter removably secured to the one of the first end or the second end of the conduit. The adapter may include an interior surface defining a second central passage, a second longitudinal axis extending along the second central passage, and a plurality of ribs formed on the interior surface. The plurality of ribs may extend circumferentially about the second longitudinal axis. Each of the plurality of ribs may be received into one of the plurality of grooves of the cylindrical conduit. The adapter may also include an end portion disposed at a first end of the adapter. The end portion may include a plurality of axially extending platforms, an annular ring portion coupled to ends of the plurality of axially extending platforms, and a plurality of apertures formed between adjacent platforms. The plurality of apertures may be circumferentially arranged about the second central longitudinal axis and extend transversely relative to the second central longitudinal axis. The adapter may also include a first grooved portion disposed adjacent to the end portion and a tapered portion formed at a second end of the adapter. The first grooved portion may include a first annular groove formed in an exterior surface of the adapter and may extend circumferentially about the second longitudinal axis. The first annular groove may have a first diameter. The tapered portion may taper inwardly along the second longitudinal axis from the first grooved portion to the second end of the adapter. The stress relief adapter system may also include a clamp received into the first annular groove of the first grooved portion.

The various aspects may include one or more of the following features. A longitudinally extending slit may be formed in the body of an adapter. The body may be formed from is thermoplastic polyurethane. The body may have a cylindrical shape. The central passage may have a cylindrical shape. The body may include an interior surface defining at least one rib extending circumferentially about the central longitudinal axis. The at least one rib may extend inwardly from the body towards the central longitudinal axis. The at least one rib may include a plurality of ribs separated axially along the central longitudinal axis. The plurality of apertures may extend through the body between an interior surface of the body and an exterior surface of the body. The plurality of apertures may be equiangularly displaced about the central longitudinal axis. The body may also include a second grooved portion formed between the first end portion and the first grooved portion. The first grooved portion may define a first annular groove formed in an exterior surface of the body that extends circumferentially about the central longitudinal axis. The first annular groove may have a first diameter. The second grooved portion may define a second annular groove formed in the exterior surface of the body and extend circumferentially about the central longitudinal axis. The second annular groove may have a second diameter. The second diameter may be greater than the first diameter. The body may also include an exterior surface and a plurality of annular ribs formed on the exterior surface along the tapered portion. The plurality of annular ribs may extend outwardly from the exterior surface and circumferentially about the central longitudinal axis. The first end portion may taper inwardly along and relative to the central longitudinal axis from a location adjacent to the first grooved portion towards an end of the body. The central passage may be sized and shaped to accept a cylindrical conduit.

The various aspects may include one or more of the following features. The adapter may include a slit extending from the interior surface to the exterior surface. The clamp may apply a clamping force that closes the slit and forces the plurality of ribs formed on the interior surface of the adapter into the plurality of grooves of the cylindrical conduit. The end portion of the adapter may taper inwardly from a location adjacent to the first grooved portion to the first end of the adapter. The adapter may also include a second grooved portion disposed between the end portion and the first grooved portion. The second grooved portion may include a second annular grooved formed in the exterior surface and extending circumferentially about the second longitudinal axis. The second annular groove may be sized and shaped to receive a second clamp. The second annular groove may have a second diameter larger than the first diameter. The tapered portion of the adapter may include at least one rib extending circumferentially about the second longitudinal axis. A second clamp may be disposed on the exterior surface of the adapter and abut the at least one rib.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
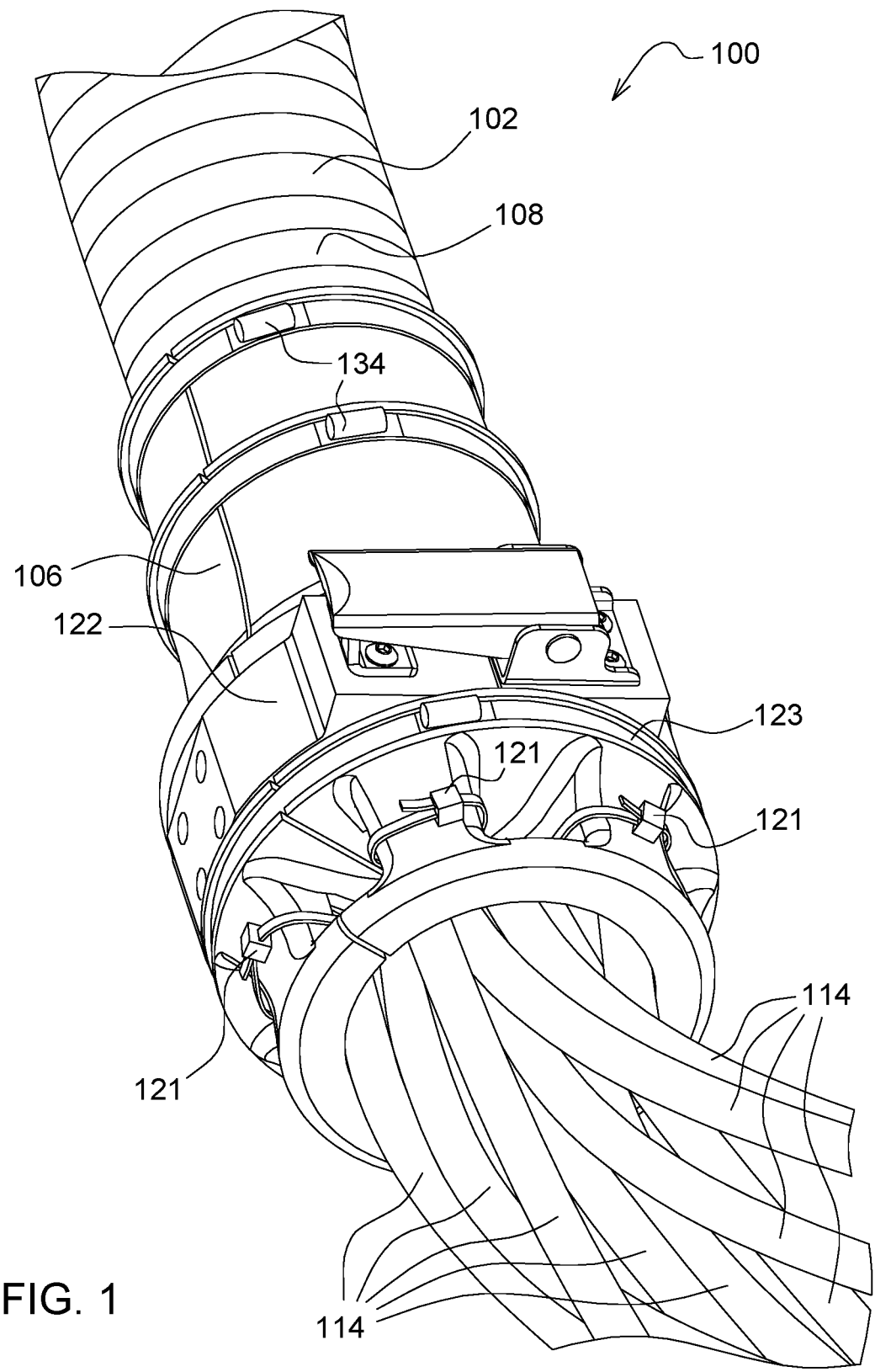
FIG. 1 is an oblique view of an example stress relief adapter system, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to stress relief adapters and stress relief adapter systems and, particularly, to stress relief adapters for industrial applications, such as for routing conduits in robotic environments. However, the scope of the disclosure is not so limited and is applicable to other applications and environments in which conduit routing is desired.

Conduits, such as routing conduits, subjected to bending tend to experience increased stresses at an end of the conduits, such as where the conduit connects to an object or where one or more items passing though the conduit extend therebeyond. At the ends, the conduits may kink and become damaged, thereby diminishing the performance or eliminating the utility of the conduits. Further, where a conduit is associated with a working machine, damage to the conduit necessitates maintenance, causing machine downtime, reduced efficiency, and increased costs. These problems may be exacerbated where the conduits provides a passage for routing other conduits, such as power cables, hydraulic lines, coolant lines, data cables, optical cables, or a combination of different cables. To avoid these problems, the present disclosure provides stress relief adapters that are couplable to an end of a conduit. The adapters distributes stresses, e.g., bending stresses, of the conduit along a length of the adapter where the two are coupled together. The adapters of the present disclosure also provide connected mounting locations for securing other components, e.g., other conduits, cables, wires, etc., extending through the conduit to which the adapter is connected.

Further, the adapters are flexible. That is, while increasing a rigidity of an end portion of a conduit (e.g., a length of a conduit to which the adapter is attached), the adapter is capable of controlled bending in response in response to applied loads, e.g., applied bending loads. As such, the adapter is deformable in a controlled way in response to loading in order to reduce stresses introduced into a conduit. As a result, stresses, such as bending stresses, occurring at an end of a conduit are distributed along a length of the adapter, thereby reducing or eliminating the risk of kinking of the conduit, such as during manipulation of the conduit. In some implementation, adapters within the scope of the present disclosure have a durometer Shore Hardness within a range of 80A and 90A. However, depending on a particular application, a durometer Shore Hardness may be above or below this range. In response to loads, the adapter reduces an amount of distortion, e.g., bending, experienced by the conduit as a result of the shape of and material forming the adapter. While the adapter reduces an amount of deflection or distortion of the conduit, the adapter is deformable, which acts to control an amount of deflection or distortion experienced by the conduit to which the adapter is attached. Consequently, with reduced deflection or distortion, internal stresses of the conduit are reduced, thereby reducing the risk of damage to the conduit, such as by kinking. Further, as described in more detail below, an amount of deflection or distortion of the adapter is controlled by construction of the adapter, such as a tapered portion that has a changing cross-sectional thickness. The tapered cross-sectional size of the tapered portion controls an amount of deflection or distortion permitted by the adapter and, thus, the portion of the conduit coupled to the adapter.

Adapters within the scope of the present disclosure are applicable to industrial applications. For example, adapters within the scope of the present disclosure are used in robotic applications to protect and maintain ends of conduits used to carry resources to a robot. For example, in some instances, a conduit carries resources such as fluid (e.g., a coolant), data (e.g., a data cable), light (e.g., an optical fiber or cable), or a power (e.g., an electrical power cable). One or more of these or other resources are routed through the conduit to the robot in the form of one or more cable, lines, conduits, or other components.

Further, as a result of motion, such as motion of a robot, a shape of the conduit carrying one or more resources changes (contained within, for example, another conduit or cable), and, in response, the conduit experiences bending stresses that tend to kink or otherwise damage the ends of the conduit particularly, for example, at ends of the conduit. Adapters and systems described herein reduce resulting stresses produced within a conduit as a result of the applied loading.

Figure 2:
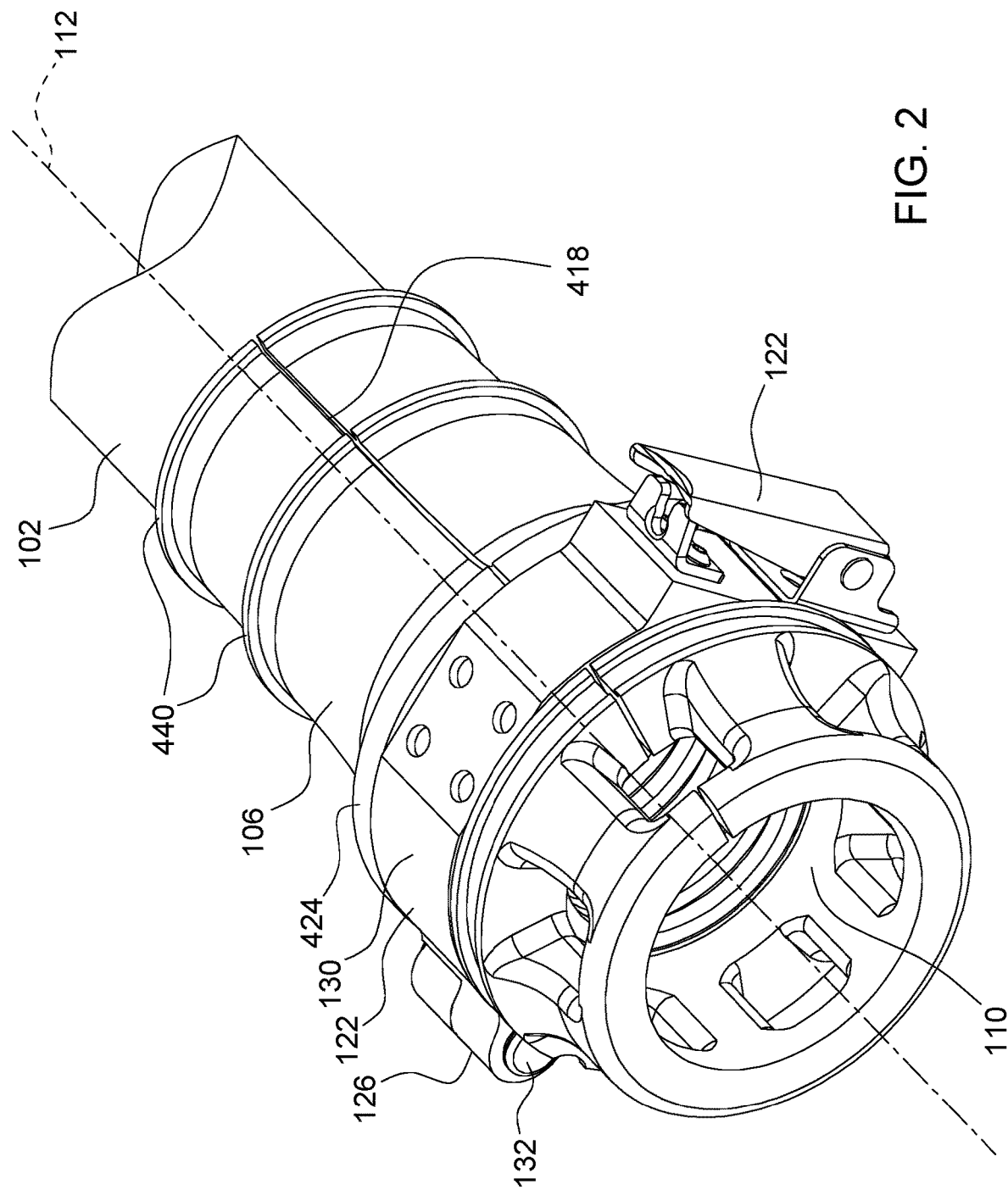
FIG. 2 is detail view of the stress relief adapter system of FIG. 1.
Figure 3:
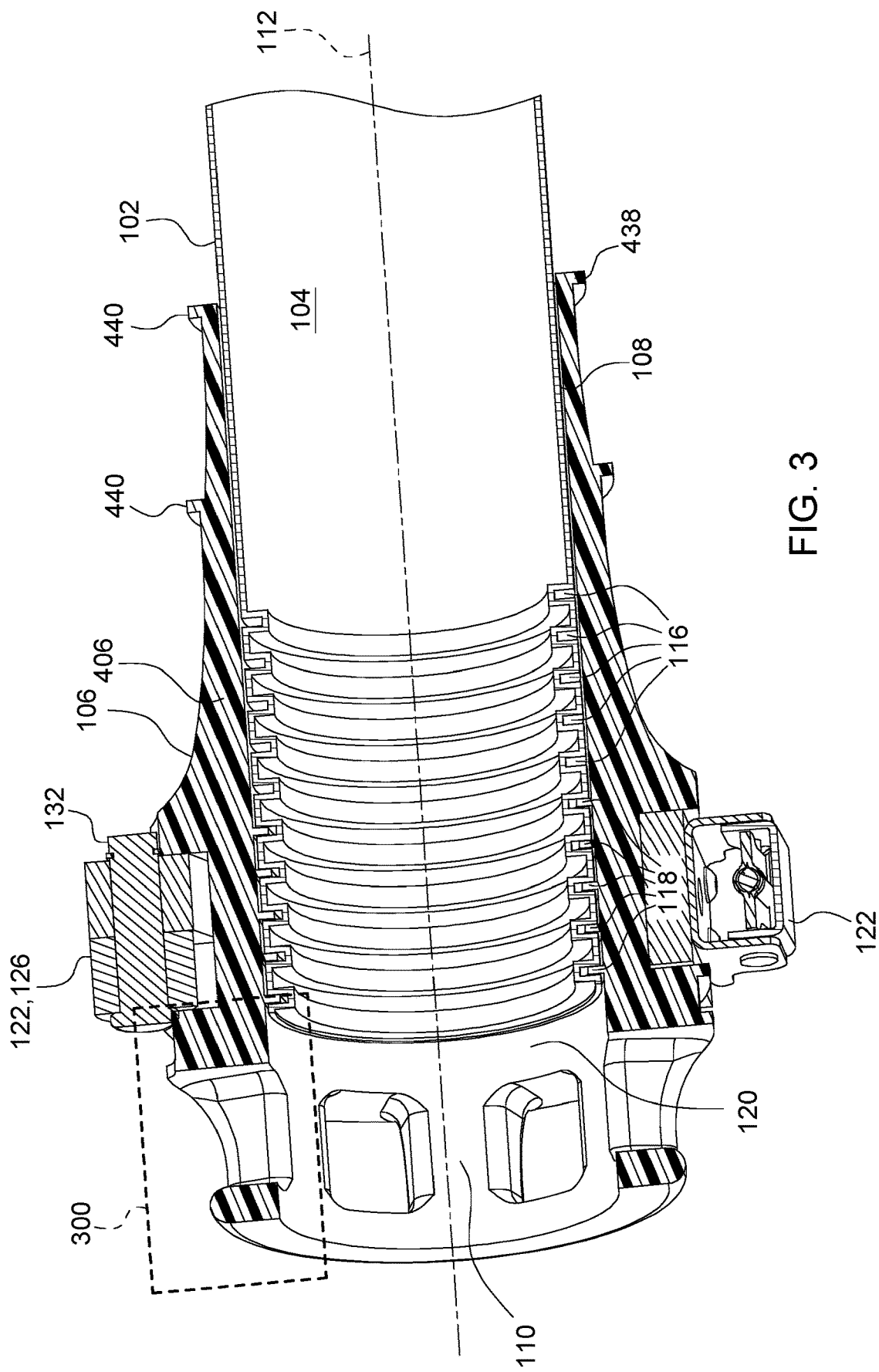
FIG. 3 is a cross-sectional view of an adapter and a conduit received into the adapter passing through a central, longitudinal axis of the adapter and conduit, according to some implementations of the present disclosure.

FIGS. 1 through 3 show an example stress relief adapter system 100 that includes a conduit 102 defining central passage 104. An adapter 106 is coupled to an end portion 108 of the conduit 102 and secured thereto. The conduit 102 is received into a central passage 110 defined by the adapter 106.

In the illustrated example, the conduit 102 has a cylindrical shape and is flexible so as to flex and bend in response to applied loads and displacement to the conduit 102 at one or more locations therealong. The central passage 104 is similarly cylindrical. More particularly, in the illustrated example, the conduit 102 and the associated central passage 104 have cylindrical shapes with circular cross-sectional shapes. In other implementations, the cross-sectional shapes of the conduit 102 and the central passage 104 may be different, such as an elliptical cross-sectional shape.

The central passage 104 defines a central, longitudinal axis 112. The central passage 104 provides for routing of various resources, such as one or more other conduits, cables, wires, optical fibers, etc., therethrough. Generally, the various resources are in the form of elongated, flexible components 114 that are able to bend and conform to changes in shape of the conduit 102, such as during movement of the conduit 102.

Figure 4:
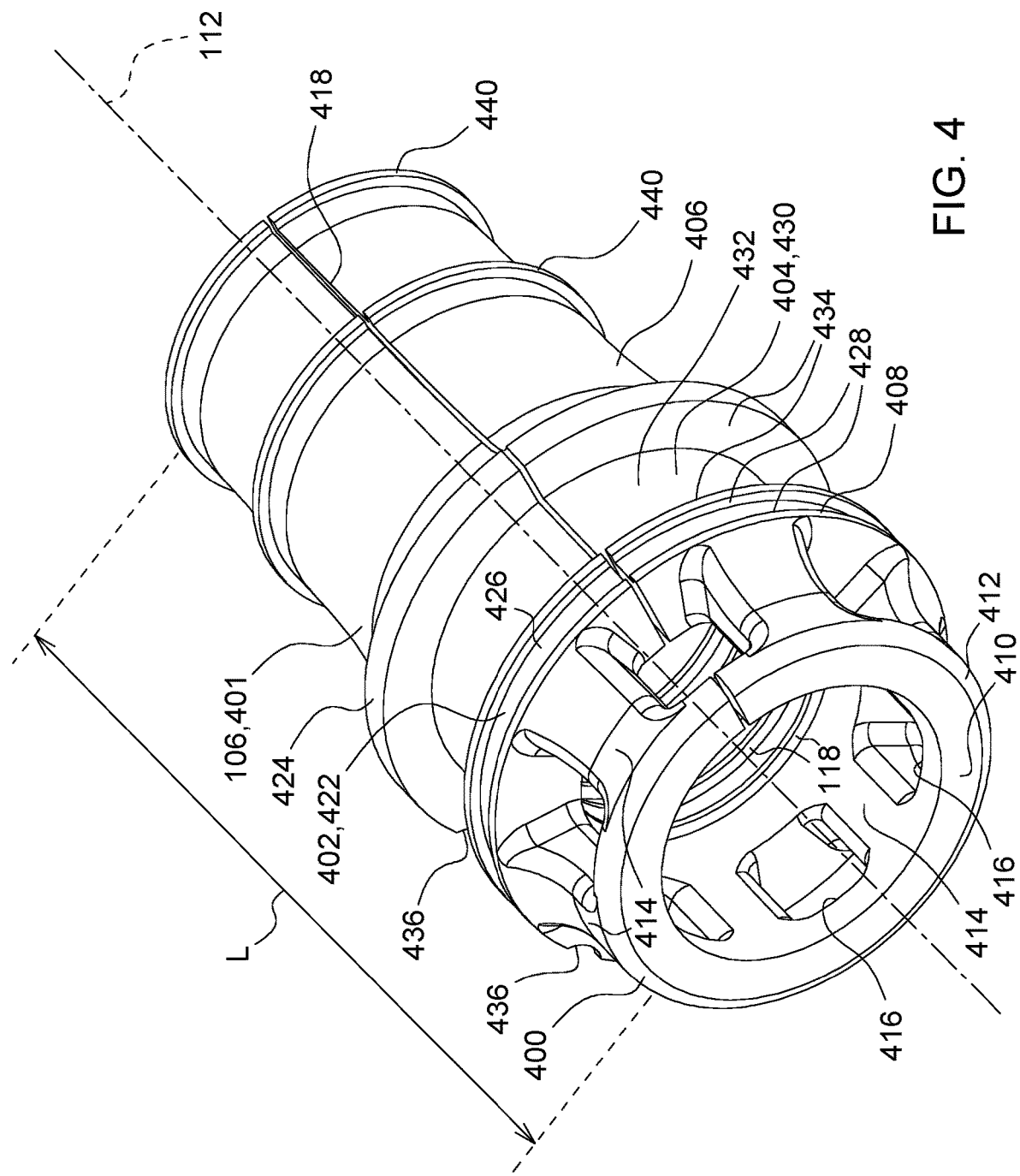
FIG. 4 is an oblique view of an example adapter, according to some implementations of the present disclosure.
Figure 5:
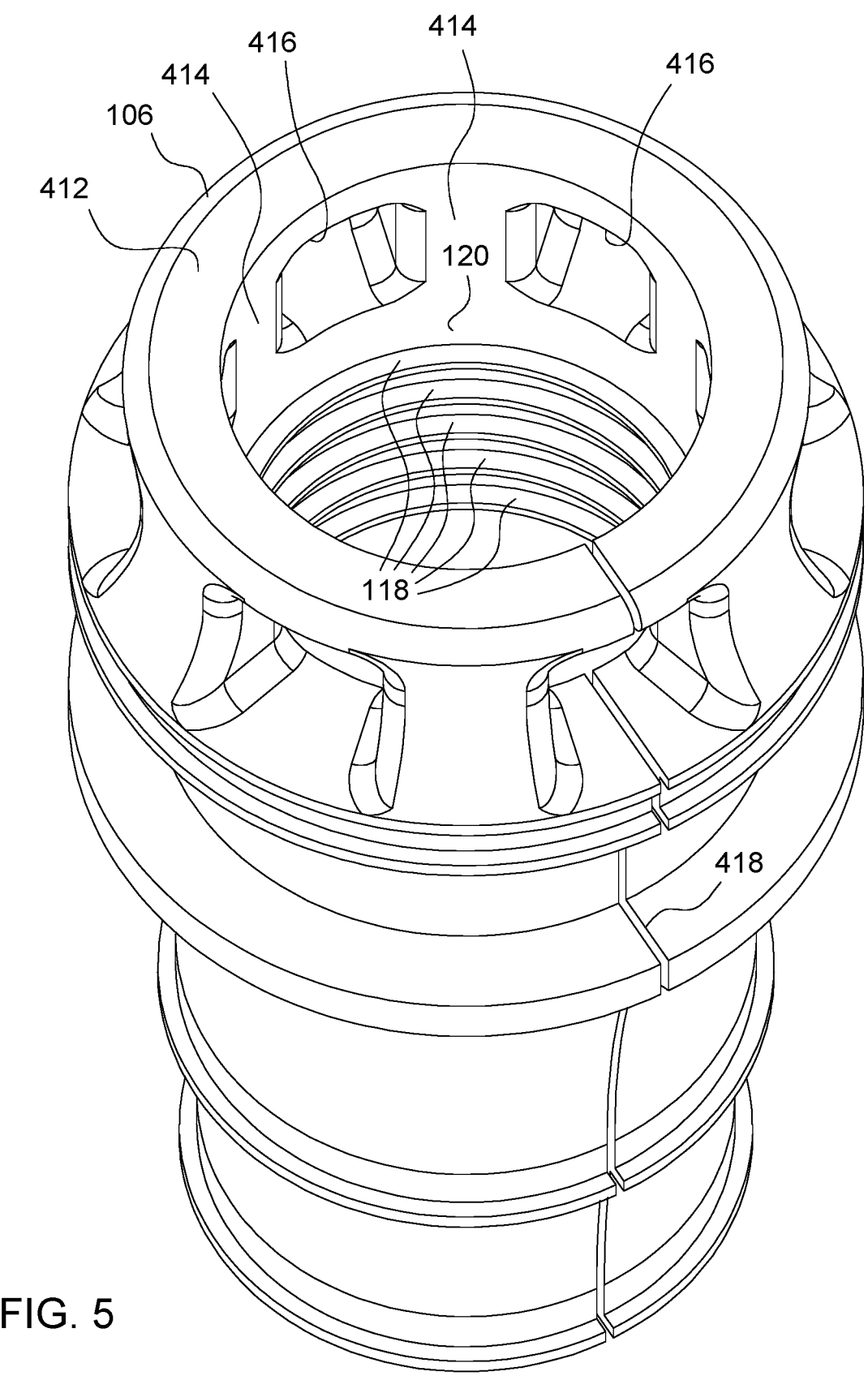
FIG. 5 is an oblique view of the adapter of FIG. 4.

In some implementations, the conduit 102 includes a plurality of grooves 116, as illustrated in FIGS. 3 through 5. For example, in some instances, the conduit 102 is corrugated along a portion or along an entirety of the conduit 102. The one or more of the grooves 116 formed in the conduit 102 interlocks with one or more ribs 118 formed on an interior surface 120 of the adapter 106 that defines the central passage 110. In the illustrated example, the ribs 118 form annular rings extending circumferentially about the longitudinal axis 112. The ribs 118 extend inwardly from the interior surface 120. In other implementations, the ribs 118 may have other orientations or configurations to align with and be received into the grooves 116 formed in the conduit 102. The interlocking between the ribs 118 and the grooves 116 secures the adapter 106 and the conduit 102 relative to each other.

Figure 6:
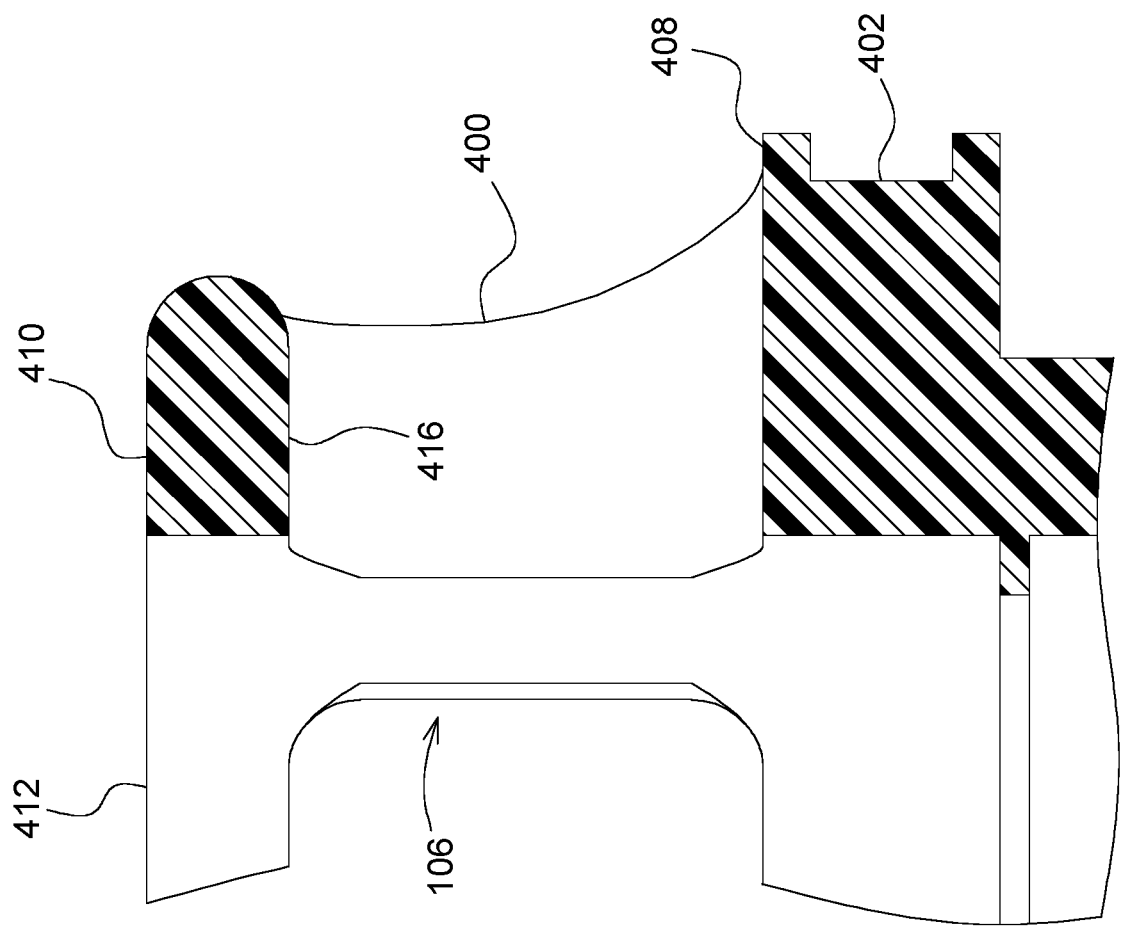
FIG. 6 is a detailed cross-sectional view of a portion of the adapter of FIG. 3 taken along an indicated plane.

Referring to FIG. 4, the adapter 106 includes a body 401 having an end portion 400, a first grooved portion 402, a second grooved portion 404, and a tapered portion 406. In the illustrated example, the end portion 400 tapers inwardly from a first location 408 adjacent to the first grooved portion to a first end 410 of the adapter 106. As also shown, the taper of the end portion 400 is a curved, as illustrated in the detailed cross-sectional view of FIG. 6. The cross-sectional view of FIG. 6 is taken along plane 300, shown in FIG. 3. The plane 300 passes through the longitudinal axis 112. In other implementations, the end portion 400 has a linear taper. In some implementations, the body 401 is formed from a material having a durometer Shore Hardness of between 80A and 90A. In some implementations, the hardness of the material forming the body 401 may be greater or less than the indicated range depending, for example, on application (e.g., an amount of desired flex based upon, for example, an amount of movement expected to be experienced by the adapter 106). In some implementations, the body 401 is formed from thermoplastic polyurethane, such as NinjaFlex® produced by Fenner, Inc., of 311 West Stiegel Street, Manheim, Pennsylvania 17545 USA. However, in other implementations, the body 401 is formed from other materials. A material used to form the body 401 may depend upon, for example, an environment in which the adapter 106 is to be placed, an ambient temperature, an ambient chemical composition, or an amount of movement expected to be experienced by the adapter 106.

The end portion 400 also includes an annular ring portion 412 disposed at the first end 410 of the adapter 106 and a plurality of longitudinally extending platforms 414 that connect to the annular ring 412. The plane 300 extends through one of the platforms 414. A plurality of apertures 416 are formed between adjacent platforms 414, bounded by the annular ring portion 412 and the first grooved portion 402. In the illustrated example, the apertures 416 are arranged circumferentially and extend radially outwardly from the longitudinal axis and through the body 401. Thus, in some implementations, the apertures 416 extend transversely relative to the longitudinal axis 112. The apertures 416 and platforms 414 provide mounting locations for clamps 121, such as wire wraps or cable ties (e.g., zip ties), that are used to secure the flexible components 106 extending through the central passage 104 of the conduit 102 and central passage 110 of the adapter 106. For example, a clamp 121 extends through adjacent apertures 416 and around a platform 414 to capture and secure a flexible component 114 to the adapter 106. In other implementations, a clamp 121 extends through apertures 416 that are not adjacent, such as to secure a plurality of flexible components 114 to the adapter 106. In the illustrated example of FIG. 1, the clamps 121 are zip ties. However, as explained above, other types of clamps can be used. In the illustrated example, the apertures 416 have a rectangular cross-sectional shape. However, in other implementations, the apertures 416 can have other cross-sectional shapes, such as circular, oval, triangular, or square. Further, in the illustrated example, the apertures have an equiangular displacement about the longitudinal axis 112. That is, in some implementations, an angular displacement between adjacent apertures is equal. In other implementations, the apertures have a non-uniform circumferential arrangement. Further, although the apertures 416 are identically shaped and sized, in other implementations, the sizes and shapes of the apertures 416 may vary.

The adapter 106 also includes a slit 418 extending along an entirety of the body 401. In the illustrated example, the slit 418 extends parallel to the longitudinal axis 418. In other implementations, the slit 418 may have other arrangements. For example, in some instances, at least part of the slit 418 defines a spiral shape about the longitudinal axis 112. Because the material forming the adapter 106 is pliable, sides 420 of the body 401 bordering the slit 418 are displaceable, providing an opening along the length L of the adapter 106. This opening provides access to the central passage 110 of the adapter 106 that facilitates insertion and removal of the conduit 102. For example, by separating the sides 420, a user is able to align the grooves 116 formed in the conduit 102 with the ribs 118 formed on the interior surface 120 of the adapter 106. Further, also due to the material forming the adapter 106, release of the sides 420 of the body 401 causes the adapter 106 to return to the initial shape, thereby closing the opening.

The first grooved portion 402 includes a groove 422 formed in an exterior surface 424 of the adapter 106. The groove 422 extends along a portion of a length L of the adapter 106. In the illustrated example, the groove 422 has a cylindrical, annular base 426 formed about the longitudinal axis 112. The base 426 is bounded by adjacent sides 428. In the illustrated example, the sides 428 are oriented perpendicularly to the base 428. The groove 422 is sized and shaped to receive a clamp 123. Example clamps 123 include hinged clamps, wire wraps, or wire ties (e.g., a zip ties), as shown in FIG. 1; wires; or cables. The second grooved portion 404 also includes a groove 430 formed in the exterior surface 424 and extending along a portion of the length L of the adapter 106. The groove 430 has a cylindrical, annular base 432 formed about the longitudinal axis 112. The base 432 is bounded by adjacent sides 434. The annular base 426 of the groove 422 defines a first diameter, and the annular base 432 of the groove 430 defines a second diameter. In the illustrated example, the first diameter is larger than the second diameter.

The groove 430 is sized and shaped to receive a clamp 122, such as a hinged clamp as shown in FIGS. 1 through 3. In the illustrated example, the clamp 122 includes opposing sides 124 connected at a hinge 126 and a releasable latch 128 that operates to secure the sides 124 together. In some implementations, the clamp 122 is formed of metal. In some implementations, exterior surfaces 130 of the sides 124 are flush with the exterior surface 424 of the adapter 106 when the clamp 122 is in a locked configuration in which the sides 124 are secured together by the latch 128. In some implementations, the exterior surface 424 of the adapter 106 includes reliefs 436 to accommodate a shape of the hinge 126, such as a pin 132 of the hinge 126. The clamp 122, along with other clamp devices provided on the adapter 106, such as the clamp 123 received into the groove 422 of the first grooved portion 402, function to close the slit 418 and secure the adapter 106 to the conduit 102.

With continued reference to FIG. 3, the tapered portion 406 tapers inwardly from the second grooved portion 404 to a second end 438. The tapered portion 406 tapers about and along the longitudinal axis 112. In the illustrated example, the tapered portion 406 has a cross-sectional shape that has a curved tapering shape, as shown in FIG. 3. In other implementations, the tapered portion 406 linearly tapers from along the longitudinal axis 112. The tapered portion 406 provides stress relief to the conduit 102. As a result of the changing cross-sectional shape of the tapered portion 406, and amount of bending along the tapered portion 406 varies as a result of the changing cross-sectional thickness of the tapered portion 406. As the cross-sectional thickness (as measured along a cross-section defined by a plane passing perpendicularly through the longitudinal axis 112) increases, a reduced amount of flexing (e.g., bending) of the adapter 106 is permitted. Consequently, an amount of bending by which the conduit 102 is permitted along an interface between the adapter 106 and the conduit 102 correspondingly varies. As a result, an amount of bending of and stresses within the conduit 102 along and adjacent to the adapter 106 are controlled compared to stresses that would exist were the adapter 106 to be omitted from the conduit 102.

In some instances, the tapered portion 406 includes annularly ribs 440 extending circumferentially about the longitudinal axis 112. The ribs 440 provide an abutment for additional clamps 134, such as wire wraps, wire ties (e.g., zip ties), wire, cable, or other types of clamping devices. In some instances, the clamps 134 rest against the ribs 440. With a positional relationship of the clamps 134 and ribs 440 illustrated in FIG. 1, the ribs 440 prevent movement of the securing devices 134 in a direction along the central longitudinal axis 112 towards the ribs 440. Example securing devices 134 are shown in FIG. 1. As explained earlier, the clamps 122, 123, and 134 cooperate to close the slit 418 and secure the adapter 106 to the conduit 102.

Without in any way limiting the scope, interpretation, or application of the claims appearing below, a technical effect of one or more of the example implementations disclosed herein is decreased stress and increased durability of an adapter and portion of a conduit engaged by the adapter, particularly during the course of articulation of the conduit, such as during movements of a robot. Another technical effect of one or more of the example implementations disclosed herein is increased durability of mounting locations of adapters to which flexible components extending through a conduit are attached to the adapter.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A stress relief adapter comprising:
   a body defining a central passage extending along and concentrically disposed about a central longitudinal axis, the body including:
   a first end portion comprising a plurality of apertures that are circumferentially arranged about the central longitudinal axis and extend transversely relative to the central longitudinal axis;
   a tapered portion that tapers about and along the central longitudinal axis; and
   a first grooved portion disposed between the first end portion and the tapered portion.

2. The stress relief adapter of claim 1, further comprising a longitudinally extending slit formed in the body.

3. The stress relief adapter of claim 1, wherein the body is formed from thermoplastic polyurethane.

4. The stress relief adapter of claim 1, wherein the body has a cylindrical shape.

5. The stress relief adapter of claim 1, wherein the central passage has a cylindrical shape.

6. The stress relief adapter of claim 1, wherein the body further includes an interior surface defining at least one rib extending circumferentially about the central longitudinal axis.

7. The stress relief adapter of claim 6, wherein the at least one rib extends inwardly from the body towards the central longitudinal axis.

8. The stress relief adaptor of claim 7, wherein the at least one rib includes a plurality of ribs separated axially along the central longitudinal axis.

9. The stress relief adapter of claim 1, wherein the plurality of apertures extend through the body between an interior surface of the body and an exterior surface of the body.

10. The stress relief adapter of claim 1, wherein the plurality of apertures are equiangularly displaced about the central longitudinal axis.

11. The stress relief adapter of claim 1, wherein the body further comprises a second grooved portion formed between the first end portion and the first grooved portion.

12. The stress relief adapter of claim of 11, wherein the first grooved portion defines a first annular groove formed in an exterior surface of the body and extending circumferentially about the central longitudinal axis, the first annular groove having a first diameter,
   wherein the second grooved portion defines a second annular groove formed in the exterior surface of the body and extending circumferentially about the central longitudinal axis, the second annular groove having a second diameter, and
   wherein the second diameter is greater than the first diameter.

13. The stress relief adapter of claim 1, wherein the body further including an exterior surface and a plurality of annular ribs formed on the exterior surface along the tapered portion, wherein the plurality of annular ribs extend outwardly from the exterior surface and circumferentially about the central longitudinal axis.

14. The stress relief adapter of claim 1, wherein the first end portion tapers inwardly along and relative to the central longitudinal axis from a location adjacent to the first grooved portion towards an end of the body.

15. The stress relief adapter of claim 1, wherein the central passage is sized and shaped to accept a cylindrical conduit.

16. A stress relief adapter system, comprising:
   a cylindrical conduit comprising:
   a first end;
   a second end;
   a first central passage extending from the first end to the second end;
   a first central longitudinal axis extending along the central passage;
   an exterior surface; and a plurality of annular grooves formed in the exterior surface and extending circumferentially about the first central longitudinal axis;

an adapter removably secured to the one of the first end or the second end of the conduit, the adapter comprising:

an interior surface defining a second central passage;

a second longitudinal axis extending along the second central passage;

a plurality of ribs formed on the interior surface, the plurality of ribs extending circumferentially about the second longitudinal axis, each of the plurality of ribs being received into one of the plurality of grooves of the cylindrical conduit;

an end portion disposed at a first end of the adapter, the end portion including:
  a plurality of axially extending platforms;
  an annular ring portion coupled to ends of the plurality of axially extending platforms; and
  a plurality of apertures formed between adjacent platforms, the plurality of apertures being circumferentially arranged about the second central longitudinal axis and extending transversely relative to the second central longitudinal axis;

a first grooved portion disposed adjacent to the end portion, the first rooved portion including:
  a first annular groove formed in an exterior surface of the adapter and extending circumferentially about the second longitudinal axis, the first annular groove having a first diameter; and a tapered portion formed at a second end of the adapter, the tapered portion tapering inwardly along the second longitudinal axis from the first grooved portion to the second end of the adapter; and a clamp received into the first annular groove of the first grooved portion.

17. The stress relief adapter system of claim 16, wherein the adapter further comprises a slit extending from the interior surface to the exterior surface, wherein the clamp applies a clamping force that closes the slit and forces the plurality of ribs formed on the interior surface of the adapter into the plurality of grooves of the cylindrical conduit.

18. The stress relief adapter system of claim 16, wherein the end portion of the adapter tapers inwardly from a location adjacent to the first grooved portion to the first end of the adapter.

19. The stress relief adapter system of claim 16, wherein the adapter further includes a second grooved portion disposed between the end portion and the first grooved portion, wherein the second grooved portion includes a second annular grooved formed in the exterior surface and extending circumferentially about the second longitudinal axis, wherein the second annular groove is sized and shaped to receive a second clamp, and wherein the second annular groove has a second diameter larger than the first diameter.

20. The stress relief adapter system of claim 16, wherein the tapered portion of the adapter includes at least one rib extending circumferentially about the second longitudinal axis and further comprising a second clamp disposed on the exterior surface of the adapter and abutting the at least one rib.

* * * * *